United States Patent
Bannon et al.

(10) Patent No.: US 6,272,253 B1
(45) Date of Patent: Aug. 7, 2001

(54) CONTENT-BASED VIDEO COMPRESSION

(75) Inventors: Thomas J. Bannon, Dallas; Rajendra K. Talluri, Plano, both of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 08/736,773

(22) Filed: Oct. 25, 1996

(51) Int. Cl.$^7$ .................. G06K 9/36; G06K 9/46
(52) U.S. Cl. ........................... 382/236; 382/243
(58) Field of Search .................... 382/236, 241, 382/242, 243, 107; 348/402, 413, 416, 421, 699

(56) References Cited

U.S. PATENT DOCUMENTS 5,686,973 * 11/1997 Lee ............................ 382/236

* cited by examiner

Primary Examiner—Phuoc Tran
(74) Attorney, Agent, or Firm—Carlton H. Hoel; W. James Brady; Frederick J. Telecky, Jr.

(57) ABSTRACT

A video compression method and system including object-oriented compression plus error correction using decoder feedback.

1 Claim, 12 Drawing Sheets

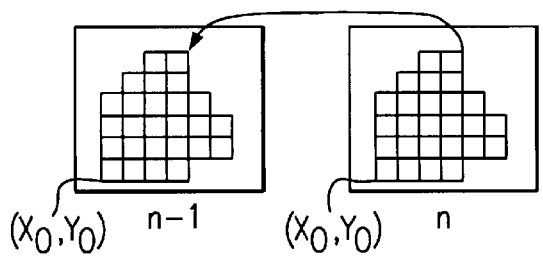
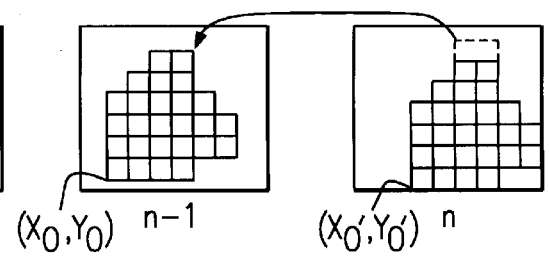
FIG. 5d-2    FIG. 5e
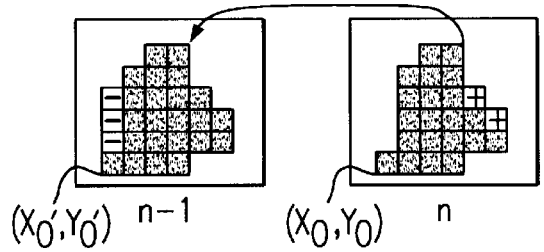
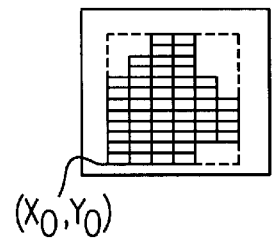
FIG. 5f    FIG. 5g
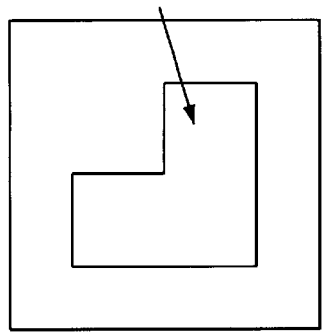
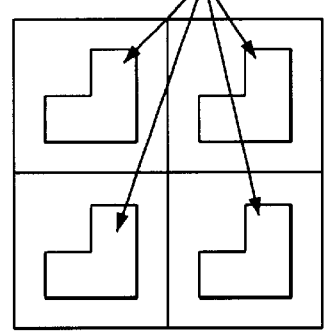
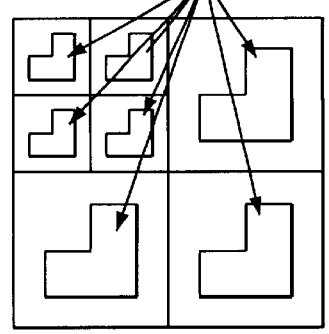
FIG. 10a    FIG. 10b    FIG. 10c
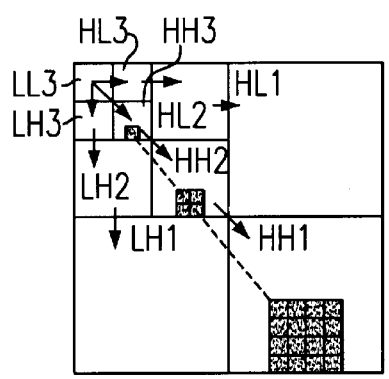
FIG. 11

CONTENT-BASED VIDEO COMPRESSION

BACKGROUND OF THE INVENTION

The invention relates to electronic video methods and devices, and, more particularly, to digital communication and storage systems with compressed video.

Video communication (television, teleconferencing, and so forth) typically transmits a stream of video frames (images) along with audio over a transmission channel for real time viewing and listening by a receiver. However, transmission channels frequently add corrupting noise and have limited bandwidth (e.g., television channels limited to 6 MHz). Consequently, digital video transmission with compression enjoys widespread use. In particular, various standards for compression of digital video have emerged and include H.261, MPEG-1, and MPEG-2, with more to follow, including in development H.263 and MPEG-4. There are similar audio compression methods such as CELP and MELP.

Tekalp, Digital Video Processing (Prentice Hall 1995), Clarke, Digital Compression of Still Images and Video (Academic Press 1995), and Schafer et al, Digital Video Coding Standards and Their Role in Video Communications, 83 Proc. IEEE 907 (1995), include summaries of various compression methods, including descriptions of the H.261, MPEG-1, and MPEG-2 standards plus the H.263 recommendations and indications of the desired functionalities of MPEG-4. These references and all other references cited are hereby incorporated by reference.

H.261 compression uses interframe prediction to reduce temporal redundancy and discrete cosine transform (DCT) on a block level together with high spatial frequency cutoff to reduce spatial redundancy. H.261 is recommended for use with transmission rates in multiples of 64 Kbps (kilobits per second) to 2 Mbps (megabits per second).

The H.263 recommendation is analogous to H.261 but for bitrates of about 22 Kbps (twisted pair telephone wire compatible) and with motion estimation at half-pixel accuracy (which eliminates the need for loop filtering available in H.261) and overlapped motion compensation to obtain a denser motion field (set of motion vectors) at the expense of more computation and adaptive switching between motion compensation with 16 by 16 macroblock and 8 by 8 blocks.

MPEG-1 and MPEG-2 also use temporal prediction followed by two dimensional DCT transformation on a block level as H261, but they make further use of various combinations of motion-compensated prediction, interpolation, and intraframe coding. MPEG-1 aims at video CDs and works well at rates about 1–1.5 Mbps for frames of about 360 pixels by 240 lines and 24–30 frames per second. MPEG-1 defines I, P, and B frames with I frames intraframe, P frames coded using motion-compensation prediction from previous I or P frames, and B frames using motion-compensated bi-directional prediction/interpolation from adjacent I and P frames.

MPEG-2 aims at digital television (720 pixels by 480 lines) and uses bitrates up to about 10 Mbps with MPEG-1 type motion compensation with I, P, and B frames plus adds scalability (a lower bitrate may be extracted to transmit a lower resolution image).

However, the foregoing MPEG compression methods result in a number of unacceptable artifacts such as blockiness and unnatural object motion when operated at very-low-bit-rates. Because these techniques use only the statistical dependencies in the signal at a block level and do not consider the semantic content of the video stream, artifacts are introduced at the block boundaries under very-low-bit-rates (high quantization factors). Usually these bloclk boundaries do not correspond to physical boundaries of the moving objects and hence visually annoying artifacts result. Unnatural motion arises when the limited bandwidth forces the frame rate to fall below that required for smooth motion.

MPEG-4 is to apply to transmission bitrates of 10 Kbps to 1 Mbps and is to use a content-based coding approach with functionalities such as scalability, content-based manipulations, robustness in error prone environments, multimedia data access tools, improved coding efficiency, ability to encode both graphics and video, and improved random access. A video coding scheme is considered content scalable if the number and/or quality of simultaneous objects coded can be varied. Object scalability refers to controlling the number of simultaneous objects coded and quality scalability refers to controlling the spatial and/or temporal resolutions of the coded objects. Scalability is an important feature for video coding methods operating across transmission channels of limited bandwidth and also channels where the bandwidth is dynamic. For example, a content-scalable video coder has the ability to optimize the performance in the face of limited bandwidth by encoding and transmitting only the important objects in the scene at a high quality. It can then choose to either drop the remaining objects or code them at a much lower quality. When the bandwidth of the channel increases, the coder can then transmit additional bits to improve the quality of the poorly coded objects or restore the missing objects.

Musmann et al, Object-Oriented Analysis-Synthesis Coding of Moving Images, 1 Sig. Proc.: Image Comm. 117 (1989), illustrates hierarchical moving object detection using source models. Tekalp, chapters 23–24 also discusses object-based coding.

Medioni et al, Corner Detection and Curvature Representation Using Cubic B-Splines, 39 Comp.Vis.Grph.Image Processing, 267 (1987), shows encoding of curves with B-Splines. Similarly, Foley et al, Computer Graphics (Addison-Wesley 2d Ed.), pages 491–495 and 504–507, discusses cubic B-splines and Catmull-Rom splines (which are constrained to pass through the control points).

In order to achieve efficient transmission of video, a system must utilize compression schemes that are bandwidth efficient. The compressed video data is then transmitted over communication channels which are prone to errors. For video coding schemes which exploit temporal correlation in the video data, channel errors result in the decoder losing synchronization with the encoder. Unless suitably dealt with, this can result in noticeable degradation of the picture quality. To maintain satisfactory video quality or quality of service, it is desirable to use schemes to protect the data from these channel errors. However, error protection schemes come with the price of an increased bitrate. Moreover, it is not possible to correct all possible errors using a given error-control code. Hence, it becomes necessary to resort to some other techniques in addition to error control to effectively remove annoying and visually disturbing artifacts introduced by these channel induced errors.

In fact, a typical channel, such as a wireless channel, over which compressed video is transmitted is characterized by high random bit error rates (BER) and multiple burst errors. The random bit errors occur with a probability of around 0.001 and the burst errors have a duration that usually lasts up to 24 milliseconds (msec).

Error correcting codes such as the Reed-Solomon (RS) codes correct random errors up to a designed number per block of code symbols. Problems arise when codes are used over channels prone to burst errors because the errors tend to be clustered in a small number of received symbols. The commercial digital music compact disc (CD) uses interleaved codewords so that channel bursts may be spread out over multiple codewords upon decoding. In particular, the CD error control encoder uses two shortened RS codes with 8-bit symbols from the code alphabet GF(256). Thus 16-bit sound samples each talke two information symbols. First, the samples are encoded twelve at a time (thus 24 symbols) by a (28,24) RS code, then the 28-symbol codewords pass a 28-branch interleaver with delay increments of 28 symbols between branches. Thus 28 successive 28-symbol codewords are interleaved symbol by symbol. After the interleaving, the 28-symbol blocks are encoded with a (32,28) RS coder to output 32-symbol codewords for transmission. The decoder is a mirror image: a (32,28) RS decoder, 28-branch deinterleaver with delay increment 4 symbols, and a (28,24) RS decoder. The (32,28) RS decoder can correct 1 error in an input 32-symbol codeword and can output 28 erased symbols for two or more errors in the 32-symbol input codeword. The deinterleaver then spreads these erased symbols over 28 codewords. The (28,24) RS decoder is set to detect up to and including 4 symbol errors which are then replaced with erased symbols in the 24-symbol output words; for 5 or more errors, all 24 symbols are erased. This corresponds to erased music samples. The decoder may interpolate the erased music samples with adjacent samples. Generally, see Wickes, Error Control Systems for Digital Communication and Storage (Prentice Hall 1995).

There are several hardware and software implementations of the H.261, MPEG-1, and MPEG-2 compression and decompression. The hardware can be single or multichip integrated circuit implementations (see Tekalp pages 455–456) or general purpose processors such as the Ultrasparc or TMS320C80 running appropriate software. Public domain software is available from the Portable Video Research Group at Stanford University.

SUMMARY OF THE INVENTION

The present invention provides content-based video compression with difference region encoding instead of strictly moving object encoding, blockwise contour encoding, motion compensation failure encoding connected to the blockwise contour tiling, subband including wavelet encoding restricted to subregions of a frame, scalability by uncovered background associated with objects, and error robustness through embedded synchronization in each moving object's code plus coder feedback to a deinterleaver. It also provides video systems with applications for this compression, such as video telephony and fixed camera surveillance for security, including time-lapse surveillance, with digital storage in random access memories.

Advantages include efficient low bitrate video encoding with object scalability and error robustness with very-low-bit-rate video compression which allows convenient transmission and storage. This permits low bitrate teleconferencing and also surveillance information storage by random access hard disk drive rather than serial access magnetic tape. And the segmentation of moving objects permits concentration on any one or more of the moving objects (MPEG-4).

BRIEF DESCRIPTION OF THE DRAWINGS

The drawings are schematic for clarity.

FIGS. 5a–h illustrate boundary contour encoding.

FIGS. 10a–c illustrates wavelet decomposition.

FIG. 11 illustrates a zerotree for wavelet coefficient quantization.

DESCRIPTION OF THE PREFERRED EMBODIMENTS

Overview of Compression and Decompression

Figure 1:
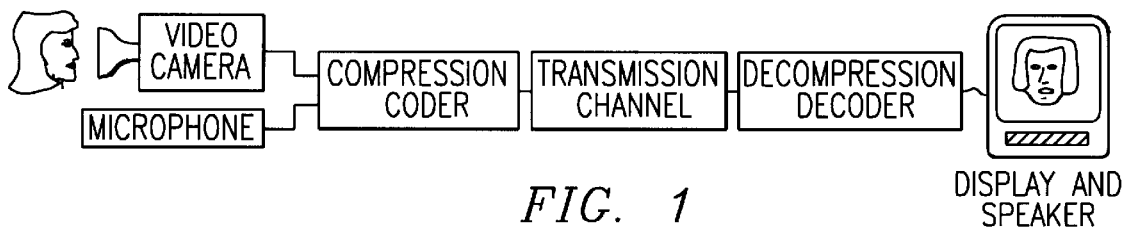
FIG. 1 shows a preferred embodiment telephony system.

FIG. 1 illustrates in block diagram a preferred embodiment video-telephony (teleconferencing) system which transmits both speech and an image of the speaker using preferred embodiment compression, encoding, decoding, and decompression including error correction with the encoding and decoding. Of course, FIG. 1 shows only transmission in one direction and to only one receiver; in practice a second camera and second receiver would be used for transmission in the opposite direction and a third or more receivers and transmitters could be connected into the system. The video and speech are separately compressed and the allocation of transmission channel bandwidth between video and speech may be dynamically adjusted depending upon the situation. The costs of telephone network bandwidth demand a low-bit-rate transmission. Indeed, very-low-bit-rate video compression finds use in multimedia applications where visual quality may be compromised.

Figure 2:
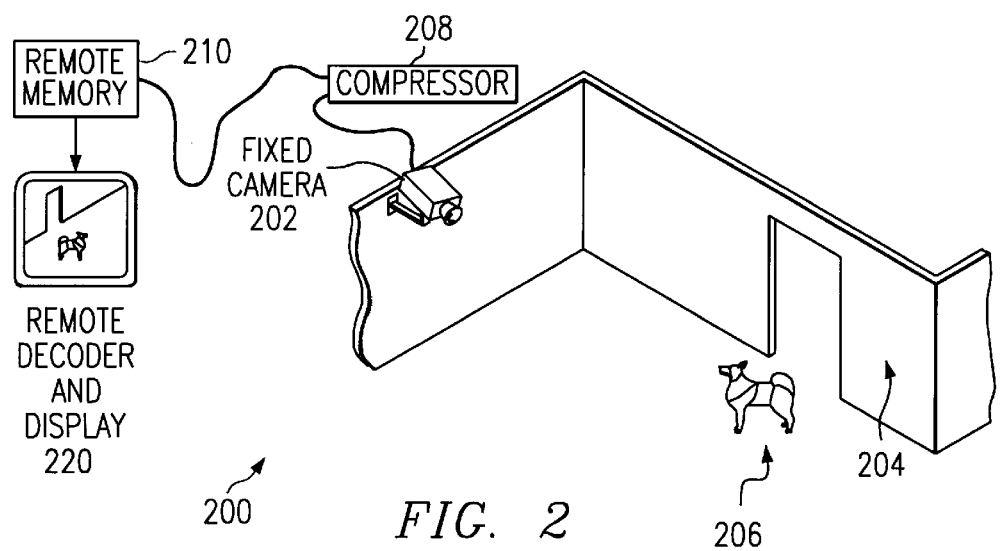
FIG. 2 illustrates a preferred embodiment surveillance system.

FIG. 2 shows a first preferred embodiment surveillance system, generally denoted by reference numeral 200, as comprising one or more fixed video cameras 202 focussed on stationary background 204 (with occasional moving objects 206 passing in the field of view) plus video compressor 208 together with remote storage 210 plus decoder and display 220. Compressor 208 provides compression of the stream of video images of the scene (for example, 30 frames a second with each frame 176 by 144 8-bit monochrome pixels) so that the data transmission rate from compressor 208 to storage 210 may be very low, for example 22 bits per second, while retaining high quality images. System 200 relies on the stationary background and only encodes moving objects (which appear as regions in the frames which move relative to the background) with predictive motion to achieve the low data rate. This low data rate enables simple transmission channels from cameras to monitors and random access memory storage such as magnetic hard disk drives available for personal computers. Indeed, a single telephone line with a modem may transmit the compressed video image stream to a remote monitor. Further, storage of the video image stream for a time interval, such as a day or week as required by the particular surveillance situation, will require much less memory after such compression.

Video camera 202 may be a CCD camera with an incamera analog-todigital convertor so that the output to compressor 208 is a sequence of digital frames as generally illustrated in FIG. 2; alternatively, analog cameras with additional hardware may be used to generate the digital video stream of frames. Compressor 208 may be hardwired or, more conveniently, a digital signal processor (DSP) with the compression steps stored in onboard memory, RAM or ROM or both. For example, a TMS320C50 or TMS320C80 type DSP may suffice. Also, for a teleconferencing system as shown in FIG. 1, error correction with real time reception may be included and implemented on general purpose processors.

Figure 3:
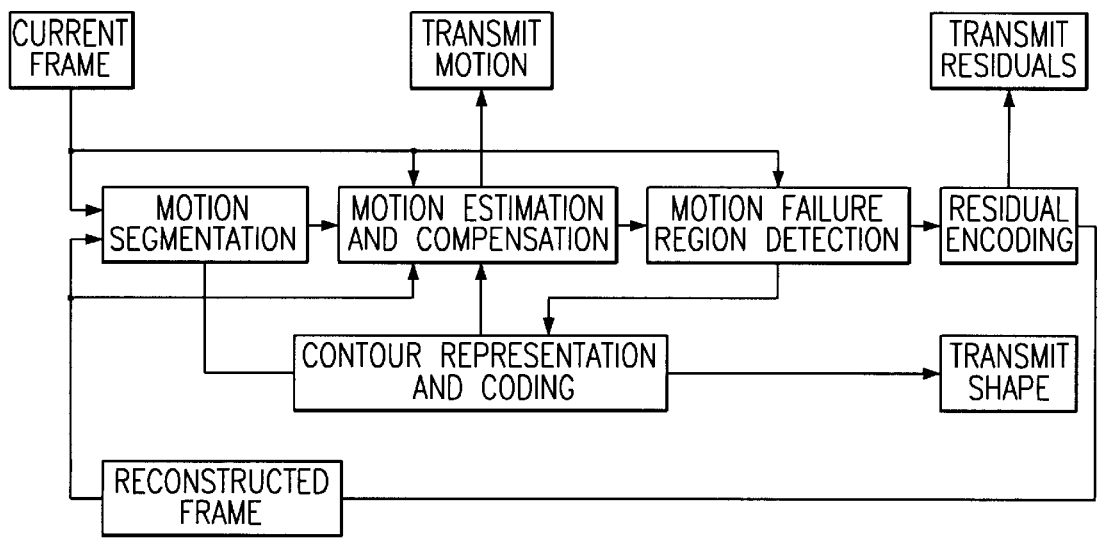
FIG. 3 is a flow diagram for a preferred embodiment video compression.

FIG. 3 shows a high level flow diagram for the preferred embodiment video compression methods which include the following steps for an input consisting of a sequence of frames, $F_0, F_1, F_2, \ldots$, with each frame 144 rows of 176 pixels or 288 rows of 352 pixels and with a frame rate of 10 frames per second. Details of the steps appear in the following sections.

Frames of these two sizes partition into arrays of 9 rows of 11 macroblocks with each macroblock being 16 pixels by 16 pixels or 18 rows of 22 macroblocks. The frames will be encoded as I pictures or P pictures; B pictures with their backward interpolation would create overly large time delays for very low bitrate transmission. An I picture occurs only once every 5 or 10 seconds, and the majority of frames are P pictures. For the 144 rows of 176 pixels size frames, roughly an I picture will be encoded with 20 Kbits and a P picture with 2 Kbits, so the overall bitrate will be roughly 22 Kbps (only 10 frames per second or less). The frames may be monochrome or color with the color given by an intensity frame (Y signal) plus one quarter resolution (subsampled) color combination frames (U and V signals).

(1) Initially, encode the zeroth frame $F_0$ as an I picture like in MPEG-1,2 using a waveform coding technique based on the DCT or wavelet transform. For the DCT case, partition the frame into 8 by 8 blocks; compute the DCT of each block; cutoff the high spatial frequencies; quantize and encode the remaining frequencies, and transmit. The encoding includes run length encoding, then Huffman encoding, and then error correction encoding. For the wavelet case, compute the multi-level decomposition of the frame; quantize and encode the resulting wavelet coefficients, and transmit. Other frames will also be encoded as I pictures with the frequency dependent upon the transmission channel bitrate. And for $_N$ to be an I picture, encode in the same manner.

(2) For frame $F_N$ to be a P picture, detect moving objects in the frame by finding the regions of change from reconstructed $F_{N-1}$ to $F_N$. Reconstructed $F_{N-1}$ is the approximation to $F_{N-1}$ which is actually transmitted as described below. Note that the regions of change need not be partitioned into moving objects plus uncovered background and will only approximately describe the moving objects. However, this approximation suffices and provides more efficient low coding. Of course, an alternative would be to also make this partition into moving objects plus uncovered background through mechanisms such as inverse motion vectors to determine if a region maps to outside of the change region in the previous frame and thus is uncovered background, edge detection to determine the object, or presumption of object characteristics (models) to distinguish the object from background.

(3) For each connected component of the regions of change from step (2), code its boundary contour, including any interior holes. Thus the boundaries of moving objects are not exactly coded; rather, the boundaries of entire regions of change are coded and approximate the boundaries of the moving objects. The boundary coding may be either by splines approximating the boundary or by a binary mask indicating blocks within the region of change. The spline provides more accurate representation of the boundary, but the binary mask uses a smaller number of bits. Note that the connected components of the regions of change may be determined by a raster scanning of the binary image mask and sorting pixels in the mask into groups, which may merge, according to the sorting of adjacent pixels. The final groups of pixels are the connected components (connected regions). For example of a program, see Ballard et al, Computer Vision (Prentice Hall) at pages 149–152. For convenience in the following the connected components (connected regions) may be referred to as (moving) objects.

(4) Remove temporal redundancies in the video sequence by motion estimation of the objects from the previous frame. In particular, match a 16 by 16 block in an object in the current frame $F_N$ with the 16 by 16 block in the same location in the preceding reconstructed frame $F_{N-1}$ plus translations of this block up to 15 pixels in all directions. The best match defines the motion vector for this block, and an approximation $F'_N$ to the current frame $F_N$ can be synthesized from the preceding frame $F_{N-1}$ by using the motion vectors with their corresponding blocks of the preceding frame.

(5) After the use of motion of objects to synthesize an approximation $F'_N$, there may still be areas within the frame which contain a significant amount of residual information, such as for fast changing areas. That is, the regions of difference between $F_N$ and the synthesized approximation $F'_N$ have motion segmentation applied analogous to the steps (2)–(3) to define the motion failure regions which contain significant information.

(6) Encode the motion failure regions from step (5) using a waveform coding technique based on the DCT or wavelet transform. For the DCT case, tile the regions with 16 by 16 macroblocks, apply the DCT on 8 by 8 blocks of the macroblocks, quantize and encode (runlength and then Huffman coding). For the wavelet case, set all pixel values outside the regions to zero, apply the multi-level decomposition, quantize and encode (zerotree and then arithmetic coding) only those wavelet coefficients corresponding to the selected regions.

(7) Assemble the encoded information for I pictures (DCT or wavelet data) and P pictures (objects ordered with each object having contour, motion vectors, and motion failure data). These can be codewords from a table of Huffman codes; this is not a dynamic table but rather generated experimentally.

(8) Insert resynchronization words at the beginning of each I picture data, each P picture, each contour data, each motion vector data, and each motion failure data. These resynchronization words are unique in that they do not appear in the Huffman codeword table and thus can be unambiguously determined.

(9) Encode the resulting bitstream from step (8) with Reed-Solomon codes together with interleaving. Then transmit or store.

(10) Decode a received encoded bitstream by Reed-Solomon plus deinterleaving. The resynchronization words help after decoding failure and also provide access points for random access. Further, the decoding may be with shortened Reed-Solomon decoders on either side of the deinterleaver plus feedback from the second decoder to the first decoder (a stored copy of the decoder input) for enhanced of error correction.

(11) Additional functionalities such as object scalability (selective encoding/decoding of objects in the sequence) and quality scalability (selective enhancement of the quality of the objects) which result in a scalable bitstream are also supported.

Moving Object Detection and segmentation

Figure 4A:
FIGS. 4a–d show motion segmentation.
Figure 4B:

The first preferred embodiment method detects and segments moving objects by use of regions of difference between successive video frames but does not attempt to segregate such regions into moving objects plus uncovered background. This simplifies the information but appears to provide sufficient quality. In particular, for frame $F_N$ at each pixel find the absolute value of the difference in the intensity (Y signal) between $_N$ and reconstructed $F_{N-1}$ For 8-bit intensities (256 levels labelled 0 to 255), the camera calibration variability would suggest taking the intensity range of 0 to 15 to be dark and the range 240–255 to be saturated brightness. The absolute value of the intensity difference at a pixel will lie in the range from 0 to 255, so eliminate minimal differences and form a binary image of differences by thresholding (set any pixel absolute difference of less than or equal to 5 or 10 (depending upon the scene ambient illumination) to 0 and any pixel absolute difference greater than 30 to 1). This yields a binary image which may appear speckled: FIGS. 4a–b illustrate two successive frames and FIG. 4c the binary image of thresholded absolute difference with black pixels indicating 1s and indicating significant differences and the white background pixels indicating 0s.

Then eliminate small isolated areas in the binary image, such as would result from noise, by median filtering (replace a 1 at a pixel with a 0 if the 4 (8) nearest neighbor pixels are all 0s).

Figure 4C:
Figure 4D:
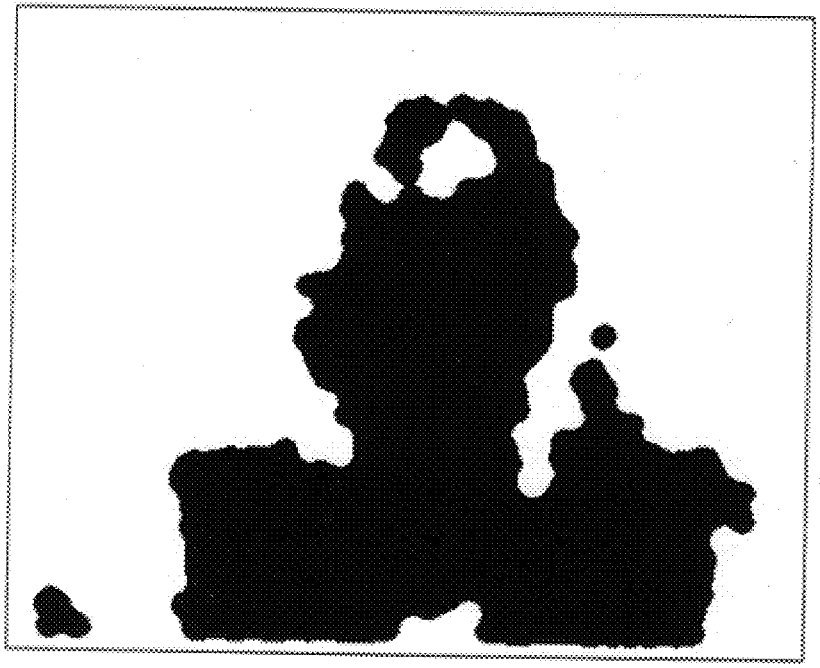

Next, apply the morphological close operation (dilate operation followed by erode operation) to fill-in between close by 1s; that is, replace the speckled areas of FIG. 4c with solid areas. Use dilate and erode operations with a circular kernel of radius K pixels (K may be 11 for QCIF frames and 13 for CIF frames); in particular, the dilate operation replaces a 0 pixel with a 1 if any other pixel within K pixels of the original 0 pixel is a 1 pixel, and the erode operation replaces a 1 pixel with a 0 unless all pixels within K pixels of the original 1 pixel are all also 1 pixels. After the close operation, apply the open operation (erode operation followed by dilate operation) to remove small isolated areas of 1s. This yields a set of connected components (regions) of 1 pixels with fairly smooth boundaries as illustrated in FIG. 4d. Note that a connected component may have one or more interior holes which also provide boundary contours.

Then raster scan the binary image to detect and label connected regions and their boundary contours (a pixel which is a 1 and has at least one nearest neighbor pixel which is a 0 is deemed a boundary contour pixel). A procedure such as ccomp (see Ballard reference or the Appendix) can accomplish this. Each of these regions presumptively indicates one or more moving objects plus background uncovered by the motion. Small regions can be disregarded by using a threshold such as a minimum difference between extreme boundary pixel coordinates. Such small regions may grow in succeeding frames and eventually arise in the motion failure regions of a later frame. Of course, a connected region cannot be smaller than the K-pixel-radius dilate/erode kernel, otherwise it would not have survived the open operation.

Contour Representation

The preferred embodiments have an option of boundary contour encoding by either spline approximation or blocks straddling the contour; this permits a choice of either high resolution or low resolution and thus provides a scalability. The boundary contour encoding with the block representation takes fewer bits but is less accurate than the spline representation. Thus a tradeoff exits which may be selected according to the application.

(i) Block boundary contour representation.

Figure 5A:
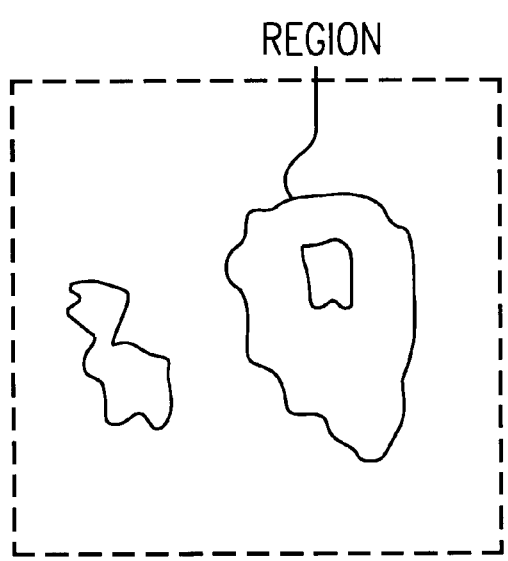
Figure 5C:
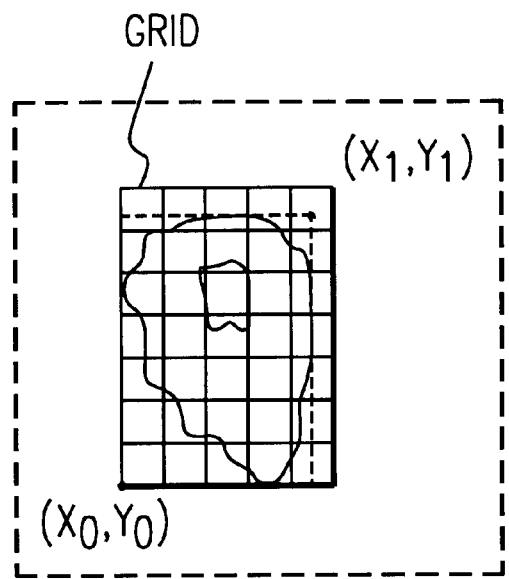
Figure 5B:
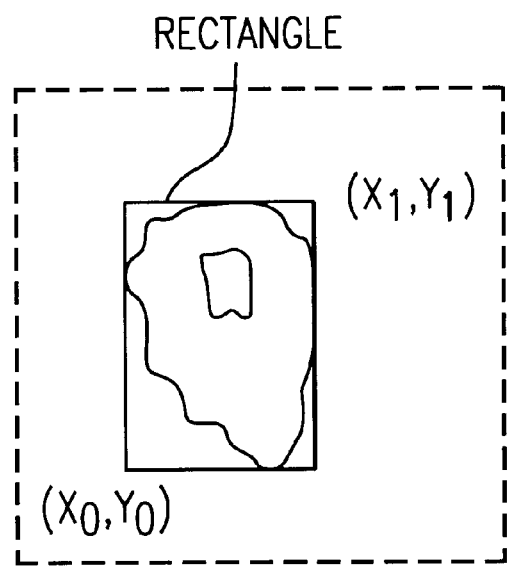

For each of the connected regions in the binary image derived from $_N$ in the preceding section, find the bounding rectangle for the region by finding the smallest and largest boundary pixel x coordinates and y coordinates: the smallest x coordinate ($x_0$) and the smallest y coordinate ($y_0$) define the lower lefthand rectangle comer ($x_0$, $y_0$) and the largest coordinates define the upper righthand comer ($x_1$, $y_1$,); see FIG. 5a showing a connected region and FIG. 5b the region plus the bounding rectangle.

Next, tile the rectangle with 16 by 16 macroblocks starting at ($x_0$, $y_0$) and with the macroblocks extending past the upper and/or righthand edges if the rectangles sides are not multiples of 16 pixels; see FIG. 5c illustrating a tiling. If the tiling would extend outside of the frame, then translate the corner ($x_0$, $y_0$) to just keep the tiling within the frame.

Figures 1, 5D:
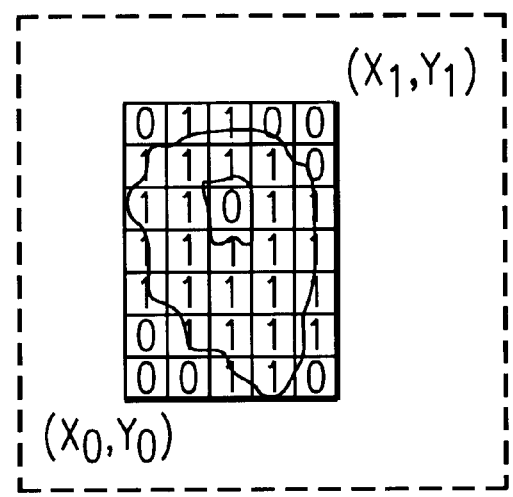

Form a bit map with a 1 representing the tiling macroblocks that have at least 50 of their 256 pixels (i.e., at least about 20%) on the boundary or inside the region and a 0 for macroblocks that do not. This provides the block description of the boundary contour: the starting corner ($x_0$, $y_0$) and the bit map. See FIG. 5d showing the bit map.

The corner plus bit map information will be transmitted if the region is small; that is, if at most 3 or 4 macroblocks tile the bounding rectangle. In case the region is larger, a more efficient coding proceeds as follows. First, compare the bit map with the bit maps of the previous frame, typically the previous frame has only 3 or 4 bit maps. If a bit map match is found, then compare the associated corner, ($x'_0$, $y'_0$), of the previous frame's bit map with ($x_0$, $y_0$). Then if ($x'_0$, $y'_0$) equals ($x_0$, $y_0$), a bit indicating the corner and bit map matching those of the previous frame can be transmitted instead of the full bit map and corner. FIG. 5e suggests this single bit contour transmission.

Similarly, if a bit map match is found with a bit map of the previous frame but the associated corner ($x'_0$, $y'_0$) does not equal ($x_0$, $y_0$), then transmit a translation vector [($x'_0$, $y'_0$)–($x_0$, $y_0$ )] instead of the full bit map and corner. This translation vector typically will be fairly small because objects do not move too much frameto-frame. See FIG. 5f Further, if a bit map match is not found, but the bit map difference is not large, such as only 4 or 5 macroblock differences, both added and removed, then transmit the locations of the changed macroblocks plus any translation vector of the associated rectangle corners, ($x'_0$, $y'_0$)–($x_0$, $y_0$). See FIG. 5g.

Lastly, for a large difference in macroblocks, just transmit the corner ($x_0$, $y_0$) plus run length encode the bit map along rows of macroblocks in the bounding rectangle as illustrated in FIG. 5h for transmission. Note that large-enough holes within the region plus projections can give rise to multiple runs in a row.

(ii) Spline boundary contour representation:

For each connected region derived in the preceding section find corner points of the boundary contour(s), including of any interior holes, of the region. Note that a region of size roughly 50 pixels in diameter will have very roughly 200–300 pixels in its boundary contour, so use about 20% of the pixels in a contour representation. A Catmull Rom spline (see the Foley reference or the Appendix) fit to the corner points approximates the boundary.

Motion Estimation

Figure 6:
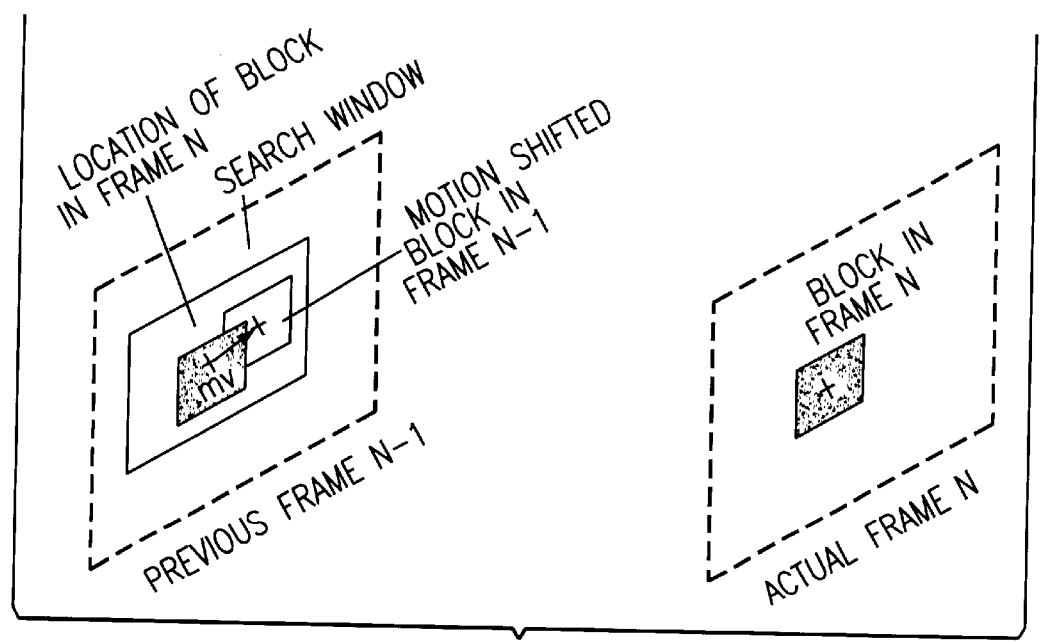
FIG. 6 shows motion compensation.

For each connected region and bit map derived from $_N$ in the preceding section, estimate the motion vector(s) of the region as follows. First, for each 16 by 16 macroblock in $F_N$ which corresponds to a macroblock indicated by the bit map to be within the region, compare this macroblock with macroblocks in the previous reconstructed frame, $F_{N-1}$, which are translates of up to 15 pixels (the search area) of this macroblock in $F_N$. The comparison is the sum of the absolute differences in the pixel intensities of the selected macroblock in $_N$ and the compared macroblock in $F_{N-1}$ with the sum over the 256 pixels of the macroblock. The search is performed at a sub-pixel resolution (half pixel with interpolation for comparison) to get a good match and extends 15 pixels in all directions. The motion vector corresponding to the translation of the selected macroblock of $F_N$ to the $F_{N-1}$ macroblock(s) with minimum sum differences can then be taken as an estimate of the motion of the selected macroblock. Note that use of the same macroblock locations as in the bit map eliminates the need to transmit an additional starting location. See FIG. 6 indicating a motion vector.

If the minimum sum differences defining the motion vector is above a threshold, then none of the macroblocks searched in $F_{N-1}$ sufficiently matches the selected macroblock in $F_N$ and so do not use the motion vector representation. Rather, simply encode the selected macroblock as an I block (intraframe encoded in its entirety) and not as a P block (predicted as a translation of a block of the previous frame).

Next, for each macroblock having a motion vector, subdivide the macroblock into four 8 by 8 blocks in $F_N$ and repeat the comparisons with translates of 8 by 8 blocks of $F_{N-1}$ to find a motion vector for each 8 by 8 block. If the total number of code bits needed for the four motion vectors of the 8 by 8 blocks is less than the number of code bits for the motion vector of 16 by 16 macroblock and if the weighted error with the use of four motion vectors compared to the single macroblock motion vector, then use the 8 by 8 block motion vectors.

Average the motion vectors over all macroblocks in $F_N$ which are within the region to find an average motion vector for the entire region. Then if none of the macroblock motion vectors differs from the average motion vector by more than a threshold, only the average motion need be transmitted. Also, the average motion vector can be used in error recovery as noted in the following Error Concealment section.

Thus for each connected region found in $F_N$ by the foregoing segmentation section, transmit the motion vector(s) plus bit map. Typically, teleconferencing with 176 by 144 pixel frames will require 100–150 bits to encode the shapes of the expected 2 to 4 connected regions plus 200–300 bits for the motion vectors.

Also, the optional 8 by 8 or 16 by 16 motion vectors and overlapped motion compensation techniques may be used.

Motion Failure Region Detection

Figure 7:
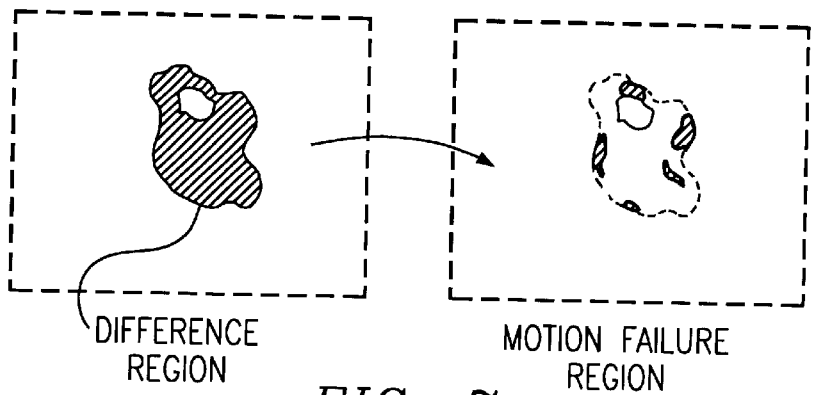
FIG. 7 illustrates motion failure regions.

An approximation to $F_N$ can be synthesized from reconstructed $F_{N-1}$ by use of the motion vectors plus corresponding (macro) blocks from $F_{N-1}$ as found in the preceding section: for a pixel in the portion of $F_N$ lying outside of the difference regions found in the Segmentation section, just use the value of the corresponding pixel in $F_{N-1}$ and for a pixel in a connected region, use the value of the corresponding pixel in the macroblock in $F_{N-1}$ which the motion vector translates to the macroblock in $F_N$ containing the pixel. The pixels in $F_N$ with intensities which differ by more than a threshold from the intensity of the corresponding pixel in the approximation synthesized by use of the motion vectors plus corresponding (macro)blocks from $F_{N-1}$ represent a motion compensation failure region. To handle this motion failure region, the intensity differences are thresholded, next median filtered, and subjected to the morphological close and open operations in the same manner as the differences from $F_{N-1}$ to $F_N$ described in the foregoing object detection and segmentation section. Note that the motion failure regions will lie inside of moving object regions; see FIG. 7 as an illustration.

If a spline boundary contour was used, then only consider the portion of a macroblock inside the boundary contour.

Residual Signal Encoding

Encode the motion failure regions as follows: tile these motion failure regions with the 16 by 16 macroblocks of the bit map of the foregoing boundary contour section, this eliminates the need to transmit a starting pixel for the tiling because it is the same as for the bit map. This also means that the tiling moves with the object and thus may lessen the changes.

Figure 8:
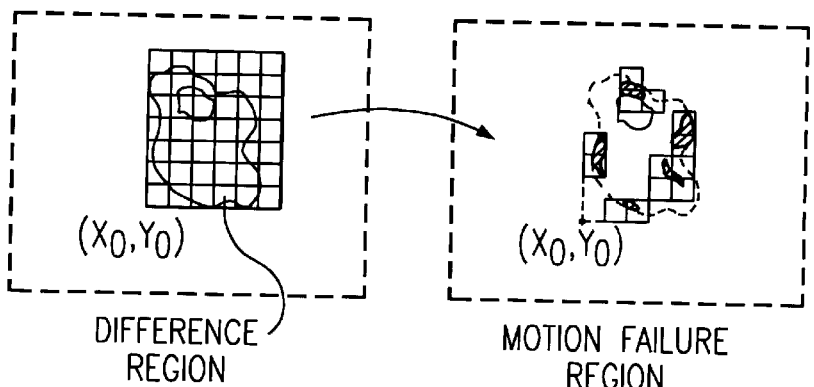
FIG. 8 shows the control grid on the motion failure regions.

For the motion failure regions, in each macroblock simply apply DCT with quantization of coefficients and runlength encoding and then Huffman encoding. See FIG. 8 showing the macroblocks within the grid.

A preferred embodiment motion failure region encoding uses wavelets instead of DCT or DPCM. In particular, a preferred embodiment uses a wavelet transform on the macroblocks of the motion failure region as illustrated in FIG. 8. Recall that a wavelet transform is traditionally a full frame transform based on translations and dilations of a mother wavelet, Y( ), and a mother scaling function, F( ); both Y( ) and F( ) are essentially nonzero for only a few adjacent pixels, depending upon the particular mother wavelet. Then basis functions for a wavelet transform in one dimension are the $Y_{nm}(t)=2^{-m/2} Y(2^{-m}t-n)$ for integers n and m. Y( ) and F( ) are chosen to make the translations and dilations orthogonal analogous to the orthogonality of the sin(kt) and cos(kt) so a transform can be easily computed by integration (summation for the discrete case). The two dimensional transform simply uses basis functions as the products of $Y_{n,m}$( )s in each dimension. Note that the index n denotes translations and the index m denotes dilations. Compression arises from quantization of the transformation coefficients analogous to compression with DCT. See for example, Antonini et al, Image Coding Using Wavelet Transform, 1 IEEE Tran. Image Proc. 205 (1992) and Mallat, A Theory for Multiresolution Signal Decomposition: The Wavelet Representation, 11 IEEE Tran. Patt. Anal.

Figure 9A:
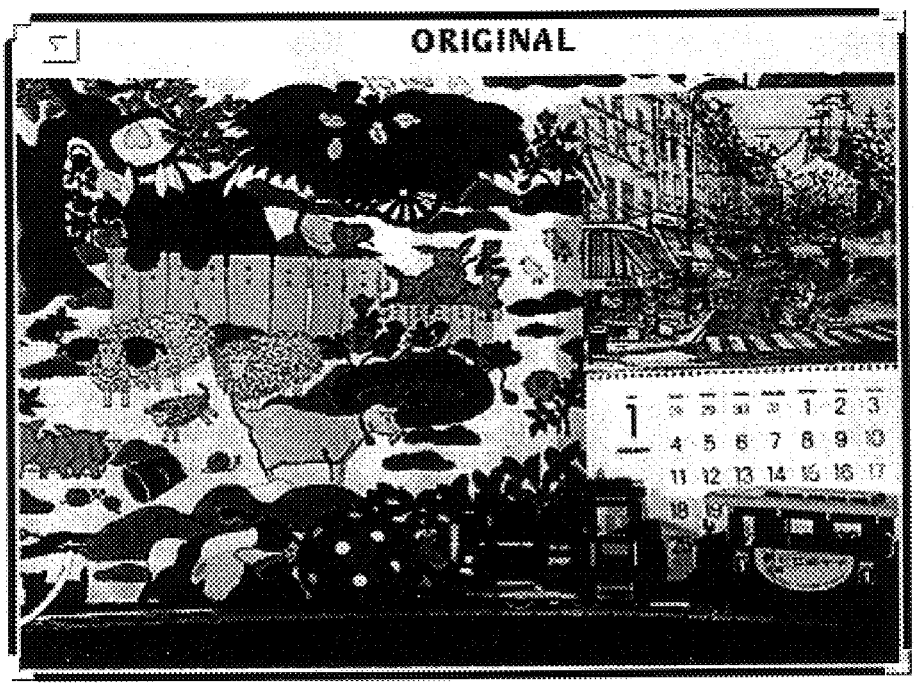
FIG. 9a–b show a single wavelet filtering stage.
Figure 9B:
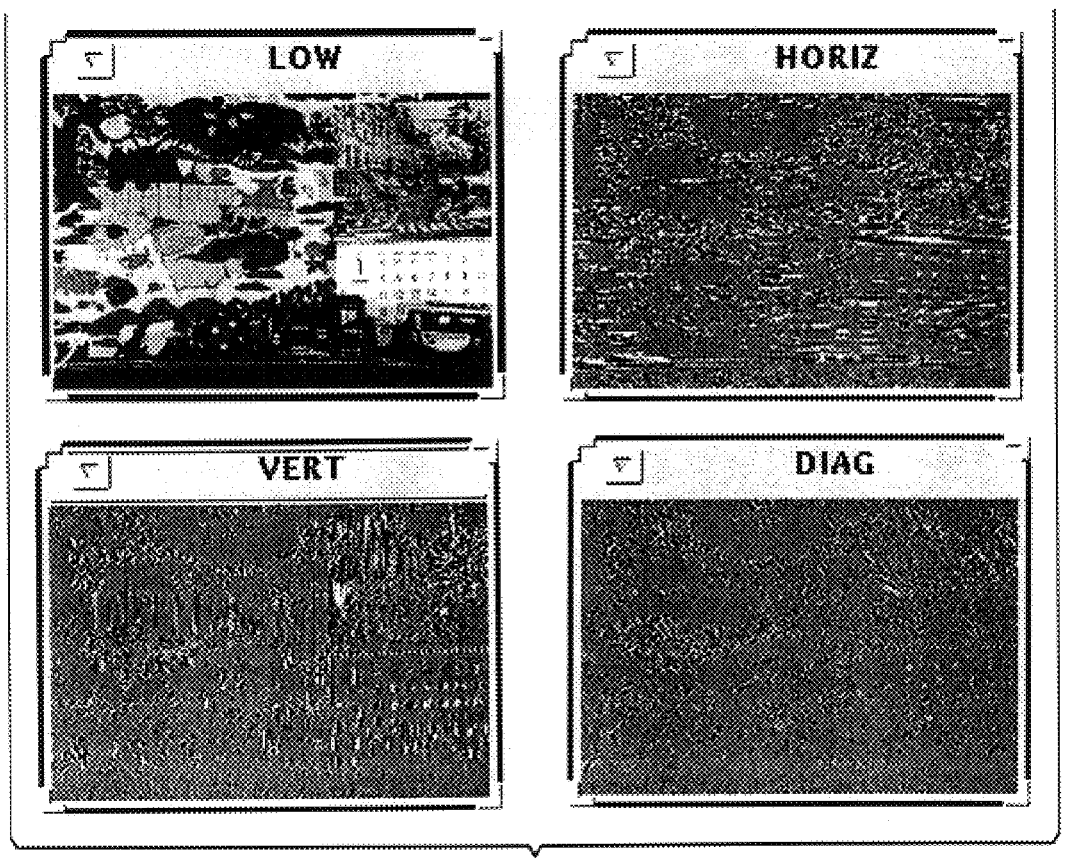

Mach. Intel. 674 (1989) for discussion of wavelet transformations. For discrete variables the wavelet transformation may also be viewed as subband filtering: the filter outputs are the reconstructions from sets of transform coefficients. Wavelet transformations proceed by successive stages of decomposition of an image through filterings into four subbands: lowpass horizontally with lowpass vertically, highpass horizontally with lowpass vertically, lowpass horizontally with highpass vertically, and highpass both horizontally and vertically. In the first stage the highpass filtering is convolution with the translates $Y_{n,1}$ and the lowpass is convolution with the scaling function translates $F_{n,1}$. At the second stage the output of the first stage subband of lowpass in both horizontal and vertical is again filtered into four subbands but with highpass filtering now convolution with $Y_{n,2}$ which in a sense has half the frequency of $Y_{n,1}$; similarly, the lowpass filtering is convolution with $F_{n,2}$. FIGS. 9a–b illustrate the four subband filterings with recognition that each filtered image can be subsampled by a factor of 2 in each direction, so the four output images have the same number of pixels as the original input image. The preferred embodiments may use biorthogonal wavelets which provides filters with linear phase. The biorthogonal wavelets are similar to the orthogonal wavelets described above but use two related mother wavelets and mother scaling functions (for the decomposition and reconstruction stages). See for example, Villasenor et al, Filter Evaluation and Selection in Wavelet Image Compression, IEEE Proceedings of Data Compression Conference, Snowbird, Utah (1994) which provides several examples of good biorthogonal wavelets. The preferred embodiment may use the (6,2) tap filter pair from the Villasenor paper which has low pass filter coefficients of: h=0.707107 $h_1$=0.707107 and g32 −0.088388 $g_1$=0.088388 $g_2$=0.707107 $g_3$=0.707107 $g_4$=0.088388 $g_5$=−0.088388 for the analysis and synthesis filters.

Preferred embodiment wavelet transforms generally selectively code information in only regions of interest in an image by coding only the regions in the subbands at each stage which correspond to the original regions of interest in the original image. See FIGS. 10a–c heuristically illustrating how regions appear in the subband filtered outputs. This approach avoids spending bits outside of the regions of interest and improves video quality. The specific use for motion failure regions is a special case of only encoding regions of interest. Note that the thesis of H. J. Barnard ("Image and Video Coding Using a Wavelet Decomposition", Technische Universiteit Delft, 1994) segments an image into relatively homogeneous regions and then uses different wavelet transforms to code each region and only considered single images, not video sequences. Barnard's method also requires the wavelet transformation be modified for each region shape; this adds complexity to the filtering stage and the coding stage. The preferred embodiments use a single filtering transform. Further, the preferred embodiment applies to regions of interest, not just homogeneous regions as in Barnard and which fill up the entire frame.

The preferred embodiments represent regions of interest with an image map. The map represents which pixels in a given image lie within the regions of interest. The simplest form is a binary map representing to be coded or not to be coded. If more than two values are used in the map, then varying priorities can be given to different regions. This map must also be transmitted to the decoder as side information. For efficiency, the map information can be combined with other side information such as motion compensation.

The map is used during quantization. Since the wavelets decompose the image into subbands, the first step is to transfer the map to the subband structure (that is, determine which locations in the subband output images correspond to the original map). This produces a set of subregions in the subbands to be coded. FIGS. 10a–c show the subregions: FIG. 10a shows the original image map with the regions of interest shown, and FIG. 10b shows the four subband outputs with the corresponding regions of interest to be coded after one stage of decomposition. FIG. 10c shows the subband structure after two stages and with the regions of interest.

The preferred embodiment first sets the pixels outside of the regions of interest to 0 and then applies the wavelet decomposition (subband filtering stages). After decomposition and during the quantization of the wavelet transform coefficients, the encoder only sends information about values that lie within the subregions of interest to be coded. The quantization of coefficients provides compression analogous to DCT transform coefficient quantization. Experiments show that the video quality increases with compression using the regions of interest approach as compared to not using it.

There is some slight sacrifice made in representing the values near the edges of the selected regions of interest because the wavelet filtering process will smear the information somewhat and any information that smears outside the region of interest boundary is lost. This means that there is no guarantee of perfect reconstruction for values inside the region of interest even if the values in the regions of interest were perfectly coded. In practice, this does not seem to be a severe hardship because the level of quantization required for typical compression applications means that the images are far from any perfect reconstruction levels anyway and the small effect near the edges can be ignored for all practical purposes.

The preferred embodiments may use the zerotree quantization method for the transform coefficients. See Shapiro, Embedded Image Coding Using Zerotrees of Wavelet coefficients, 41 IEEE Trans. Sig. Proc. 3445 (1993) for details of the zerotree method applied to single images. The zerotree method implies that the only zerotrees that lie within the subregions of interest are coded. Of course, other quantization methods could be used instead of zerotree. FIG. 11 illustrates the zerotree relations.

In applications the regions of interest can be selected in many ways, such as areas that contain large numbers of errors (such as quantizing video after motion compensation) or areas corresponding to perceptually important images features (such as faces) or objects for scalable compression. Having the ability to select regions is especially useful in motion compensated video coding where quantization of residual images typically contain information concentrated in areas of motion rather than uniformly spread over the frame.

Regions of interest can be selected as macroblocks which have errors that exceed a threshold after motion compensation. This application essentially combines region of interest map information with motion compensation information. Further, the regions of interest could be macroblocks covering objects and their motion failure regions as described in the foregoing.

Figure 12:
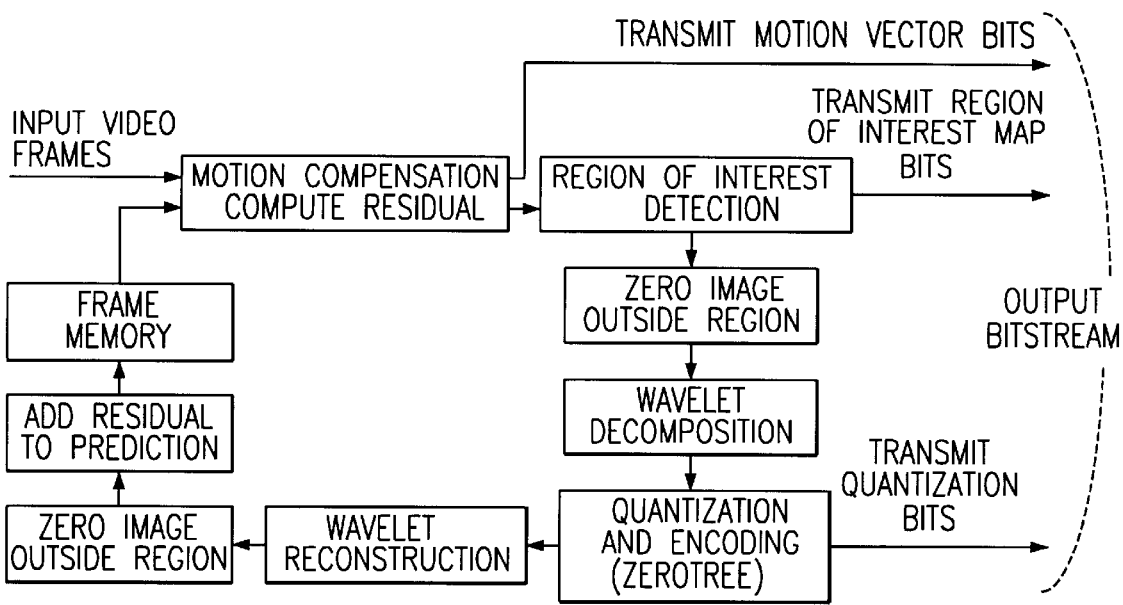
FIG. 12 is a wavelet compressor block diagram.

FIG. 12 illustrates a video compressor using the wavelet transform on regions of interest.

An alternative preferred embodiment uses a wavelet transform on the motion failure region macroblocks and these may be aligned with the rectangular grid.

(1) Initially, encode the zeroth frame $F_0$ as an I picture. Compute the multi-level decomposition of the entire frame; quantize and encode the resulting wavelet coefficients, and transmit. The preferred embodiment uses the zerotree method of quantization and encoding. Any subsequent frame $F_N$ that is to be an I picture can be encoded in the same manner.

(2) For each frame encoded as a P picture (not an I picture), perform motion compensation on the input frame by comparing the pixel values in the frame with pixel values in the previous reconstructed frame. The resulting predicted frame is subtracted from the input frame to produce a residual image (different between predicted and actual pixel values). The motion compensation can be done using the segmentation approach described earlier or simply on a block by block basis (as in H.263). The resulting motion vector information is coded and transmitted.

(3) For each residual image computed in step (2), determine the region or regions of interest that require additional information to be sent. This can be done using the motion failure approach described earlier or simply on a macroblock basis by comparing the sum of the squared residual values in a macroblock to a threshold and including only those macroblocks above the threshold in the region of interest. This step produces a region of interest map. This map is coded and transmitted. Because the map information is correlated with the motion vector information in step (2), an alternative preferred embodiment codes and transmits the motion vector and map information together to reduce the number of bits required.

(4) Using the residual image computed in step (2) and the region of interest map produced in step (3), values in the residual images that correspond to locations outside the region of interest map can be set to zero. This insures that values outside the region of interest will not affect values within the region of interest after wavelet decomposition. Step (4) is optional and may not be appropriate if the region based wavelet approach is applied to something besides motion compensated residuals.

(5) The traditional multi-level wavelet decomposition is applied to the image computed in step (4). The number of filtering operations can be reduced (at the cost of more complexity) by performing the filtering only within the regions of interest. However, because of the zeroing from step (4), the same results will be obtained by performing the filtering on the entire image which simplifies the filtering stage.

(6) The decomposed image produced in step (5) is next quantized and encoded. The region of interest map is used to specify which corresponding wavelet coefficients in the decomposed subbands are to be considered. FIG. 10 shows how the region of interest map is used to indicate which subregions in the subbands are to be coded. Next, all coefficients within the subregions of interest are quantized and encoded. The preferred embodiment uses a modification of the zerotree approach by Shapiro, which combines correlation between subbands, scalar quantization and arithmetic coding. The zerotree approach is applied to those coefficients within the subregions of interest. Other quantization and coding approaches could also be used if modified to only code coefficients within the subregions of interest. The output bits of the quantization and encoding step is then transmitted. The resulting quantized decomposed image is used in step (7).

(7) The traditional multi-level wavelet reconstruction is applied to the quantized decomposed image from step (6). The number of filtering operations can be reduced (at the cost of more complexity) by performing the filtering only within the regions of interest. However, because of the zeroing from step (4), the same results will be obtained by performing the filtering on the entire image which simplifies the filtering stage.

(8) As in step (4), the reconstructed residual image computed in step (7) and the region of interest map produced in step (3) can be used to zero values in the reconstructed residual image that correspond to locations outside the region of interest map. This insures that values outside the region of interest will not be modified when the reconstructed residual is added to the predicted image. Step (8) is optional and may not be appropriate if the region based wavelet approach is applied to something besides motion compensated residuals.

(9) The resulting residual image from step (8) is added to the predicted frame from step (2) to produce the reconstructed frame (this is what the decoder will decode). The reconstructed frame is stored in a frame memory to be used to for motion compensation for the next frame.

More generally, subband filtering of other types such as QMF and Johnston could be used in place of the wavelet filtering provided that the region of interest based approach is maintained.

Scalability

The object oriented approach of the preferred embodiments permits scalability. Scalable compression refers to the construction of a compressed video bit stream that can have a subset of the encoded information removed, for example all of the objects representing a particular person, and the remaining bitstream will still decode correctly, that is, without the removed person, as if the person were never in the video scenes. The removal must occur without decoding or recoding any objects. Note that the objects may be of different types, such as "enhancement" objects, whose loss would not remove the object from the scene, but rather just lower the quality of its visual appearance or omit audio or other data linked to the object.

Figure 13A:
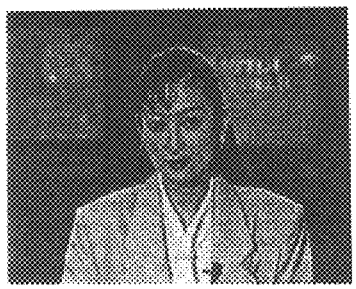
FIGS. 13a–v show scalability steps.
Figure 13B:
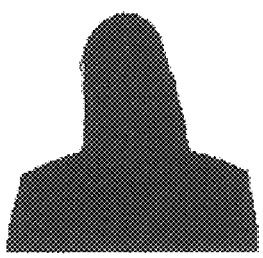

The preferred embodiment scalable object-based video coding proceeds as follows:

Presume an input video sequence of frames together with a segmentation mask for each frame, the mask delineates which pixels belong to which objects. Such a mask can be developed by difference regions together with inverse motion vectors for determining uncovered background plus tracking through frames of the connected regions, including mergers and separations, of the mask for object identification. See the background references. The frames are coded as I frames and P frames with the initial frame being an I frame and other I frames may occur at regular or irregular intervals thereafter. The intervening frames are P frames and rely on prediction from the closest preceding I frame. For an I frame define the "I objects" as the objects the segmentation mask identifies; the I-objects are not just in the I frames but may persist into the P frames. FIGS. 13a–b illustrates a first frame plus its segmentation mask.

Figure 13C:
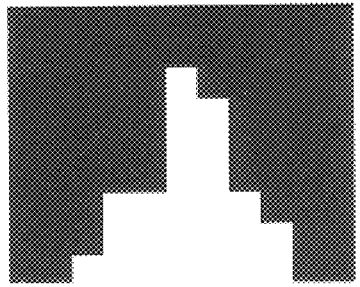
Figure 13D:
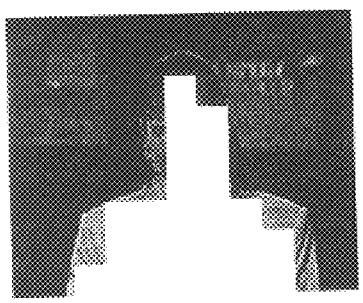

Encode an I frame by first forming an inverse image of the segmentation mask. Then this image is blocked (covered with a minimal number of 16 by 16 macroblocks aligned on a grid), and the blocked image is used as a mask to extract the background image from the frame. See FIGS. 13c–d illustrating the blocked image and the extracted background.

Next, the blocked mask is efficiently encoded, such as by the differential contour encoding of the foregoing description. These mask bits are put into the output bitstream as part of object#0 (the background object).

Then the extracted background is efficiently encoded, such as by DCT encoded 16 by 16 macroblocks as in the foregoing. These bits are put into the output bitstream as part of object#0.

Figure 13E:
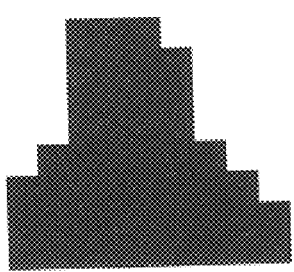
Figure 13F:
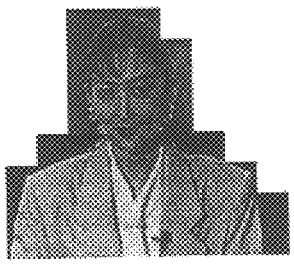

Further, for each object in the frame, the segmentation mask for that object is blocked and encoded, and that object extracted from the first frame via the blocked mask and encoded, as was done for the background image. See FIGS. 13e–f illustrating the blocked object mask and extracted object. The blocked mask and extracted object are encoded in the same manner as the background and the bits put into the output bitstream.

As each object is put into the bitstream it is preceded by a header of fixed length wherein the object number, object type (such as I-object) and object length (in bits) is recorded.

Figure 13G:
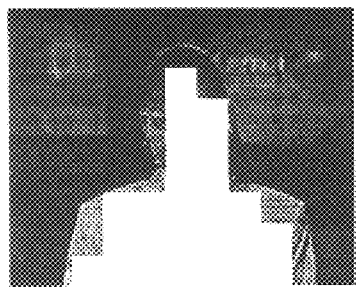
Figure 13H:
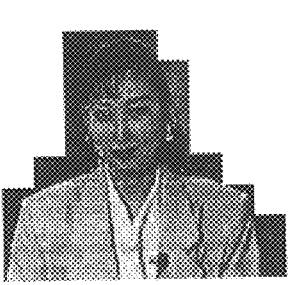
Figure 13I:
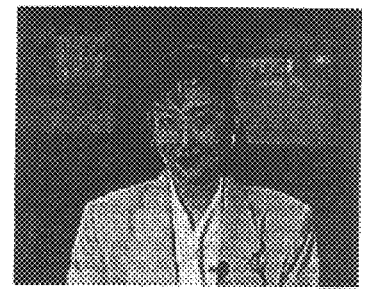
Figure 13J:
Figure 13K:
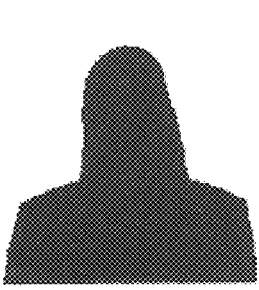
Figure 13L:
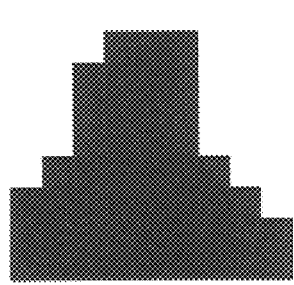
Figure 13M:

After all of the objects have been coded, a reconstructed frame is made, combining decoded images of the background and each object into one frame. This reconstructed frame is the same frame that will be produced by the decoder if it decodes all of the objects. Note that overlapping macroblocks (from different objects) will be the same, so the reconstruction will not be ambiguous. See FIGS. 13g–illustrating the reconstructed background and objects and frame.

An average frame is calculated from the reconstructed frame. An average pixel value is calculated for each channel (e.g., luminance, blue, and red) in the reconstructed frame and those pixel values are replicated in their channels to create the average frame. The three average pixel values are written to the output bitstream. This completes the I frame encoding.

Following the I frame, each subsequent frame of the video sequence is encoded as a P frame until the next, if any, I frame. The "P" stands for "predicted" and refers to the fact that the P frame is predicted from the frame preceding it (I frames are coded only with respect to themselves). Note that there is no requirement in the encoder that every frame of the input is encoded, every third frame of a 30 Hz sequence could be coded to produce a 10 Hz sequence.

As with the I frame, for a P frame block the segmentation mask for each object and extract the object. See FIGS. 13j–m showing a P frame, an object mask, the blocked object mask, and the extracted object, respectively. Do not use object #0 (the background) because it should not be changing and should not need prediction.

Figure 13N:
Figure 13O:
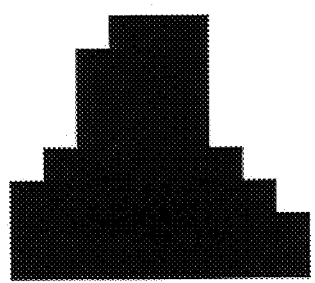

Next, each of the extracted objects is differenced with its reconstructed version in the previous frame. The block mask is then adjusted to reflect any holes that might have opened up in the differenced image; that is, the reconstructed object may closely match a portion of the object so the difference may be below threshold in an area within the segmentation mask, and this part need not be separately encoded. See FIGS. 13n–o showing the object difference and the adjusted block mask, respectively Then the block mask is efficiently encoded and put into the output bitstream.

Figure 13P:

To have a truly object-scalable bitstream the motion vectors corresponding to the blocks tiling each of the objects should only point to locations within the previous position of this object. Hence in forming this bitstream, for each of the objects to be coded in the current image, the encoder forms a separate reconstructed image with only the reconstructed version of this object in the previous frame and all other objects and background removed. The motion vectors for the current object are estimated with respect to this image. Before performing the motion estimation, all the other areas of the reconstructed image where the object is not defined (non mask areas) are filled with an average background value to get a good motion estimation at the block boundaries. This average value can be different for each of the objects and can be transmitted in the bitstream for use by the decoder. FIG. 13p shows an image of a reconstructed object with the average value in the non mask areas. This is the image used for motion estimation. The calculated motion vectors are then efficiently encoded and put in the bitstream.

Figure 13Q:
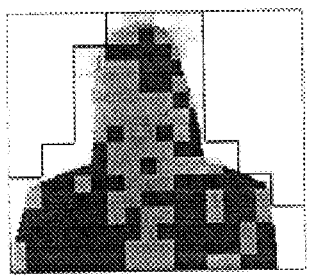
Figure 13R:
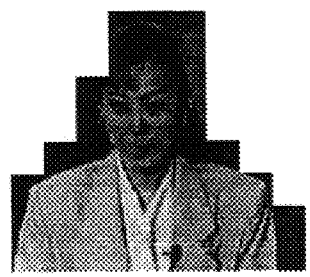

Then the differences between the motion compensated object and the current object are DCT (or wavelet) encoded on a macroblock basis. If the differences do not meet a threshold, then they are not coded, down to an 8 by 8 pixel granularity. Also, during motion estimation, some blocks could be designated INTRA blocks (as in an I frame and as opposed to INTER blocks for P frames) if the motion estimation calculated that it could not do a good job on that block. INTRA blocks do not have motion vbectors, and their DCT coding is only with respect to the current block, not a difference with a compensated object block. See FIGS. 13q–r illustrating the blocks which were DCT coded (INTRA blocks).

Next, the uncovered background that the object's motion created (with respect to the object's position in the previous frame) is calculated and coded as a separate object for the bitstream. This separate treatment of the uncovered background (along with the per object motion compensation) is what makes the bitstream scalable (for video objects). The bitstream can be played as created; the object and its uncovered background can be removed to excise the object from the playback, or just the object can be extracted to play on its own or to be added to a different bitstream.

Figure 13S:
Figure 13T:
Figure 13U:

To calculate the uncovered background, the object's original (not blocked) segmentation masks are differenced such that all of the pixels in the previous mask belonging to the current mask are removed. The resulting image is then blocked and the blocks used as a mask to extract the uncovered background from the current image. See FIGS. 13s–u illustrating the uncovered background pixels, a block mask for the pixels and the image within the mask.

Figure 13V:

The uncovered background image is DCT encoded as INTRA blocks (making the uncovered background objects I objects). See FIG. 13v for the reconstructed frame.

Decoding the bitstream for the scalable object-based video works in the same manner as the previously described decoder except that it decodes an object at a time instead of a frame at a time. When dropping objects, the decoder merely reads the object header to find out how many bits long it is, reads that many bits, and throws them away.

Further, quality scalability can also be achieved by providing an additional enhancement bitstream associated with each object. By decoding and using the enhancement bitstream the quality of the selected objects can be improved. If the channel bandwidth does not allow for the transmission of this enhanced bitstream it can dropped at the encoder. Alternately the decoder may also optimize its performance by choosing to drop the enhancement bitstreams associated with certain objects if the application does not need them. The enhancement bitstream corresponding to a particular object is generated at the encoder by computing the differences between the object in the current frame and the final reconstructed object (after motion failure region encoding) and again DCT (or Wavelet) encoding these differences with a lower quantization factor. Note that the reconstructed image should not be modified with these differences for the bitstream to remain scalable i.e., the encoder and decoder remain in synchronization even if the enhancement bitstreams for certain objects are dropped.

Figure 14A:
FIGS. 14a–b are a scene with and without a particular object.
Figure 14B:
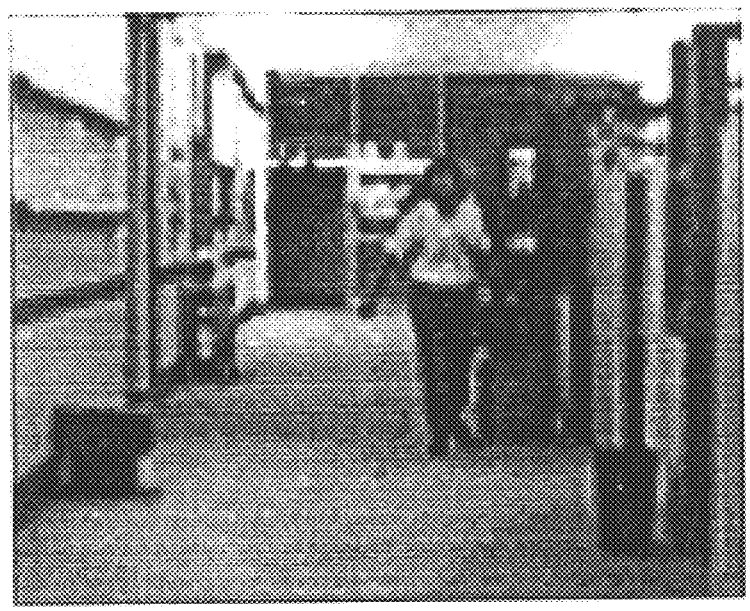

FIGS. 14a–b illustrate the preferred embodiment object removal: the person on the left in FIG. 14a has been removed in FIG. 14b.

Error Concealment

The foregoing object-oriented methods compress a video sequence by detecting moving objects (or difference regions which may include both object and uncovered background) in each frame and separating them from the stationary background. The shape, content and motion of these objects can then be efficiently coded using motion compensation and the differences, if any, using DCT or wavelets. When this compressed data is subjected to channel errors, the decoder loses synchronization with the encoder, which manifests itself in a catastrophic loss of picture quality. Therefore, to enable the decoder to regain synchronization, the preferred embodiment resynchronization words can be inserted into the bitstream. These resynchronization words are introduced at the start of the data for an I frame and at the start of each the codes for the following items for every detected moving object in a P frame in addition to the start of the P frame:

(i) the boundary contour data (bitmap or spline);
(ii) the motion vector data; and
(iii) the DCT data for the motion failure regions.

Further, if control data or other data is also included, then this data can also have resynchronization words. The resynchronization words are characterized by the fact that they are unique; i.e., they are different from any given sequence of coded bits of the same length because they are not in the Huffman code table which is a static table. For example, if a P frame had three moving objects, then the sequence would look like:

frame begin resynchronization word
contour resynchronization word
first object's contour data (e.g., bitmap or spline)
motion vector resynchronization word
first object's motion vectors (related to bitmap macroblocks)
DCT/wavelet resynchronization word
first object's motion failure data
contour resynchronization word
second object's contour data
motion vector resynchronization word
second object's motion vectors
DCT/wavelet resynchronization word
second object's motion failure data
contour resynchronization word
third object's contour data
motion vector resynchronization word
third object's motion vectors data
DCT/wavelet resynchronization word
third object's motion failure data These resynchronization words also help the decoder in detecting errors.

Once the decoder detects an error in the received bitstream, it tries to find the nearest resynchronization word. Thus the decoder reestablishes synchronization at the earliest possible time with a minimal loss of coded data.

An error may be detected at the decoder if any of the following conditions is observed:

(i) an invalid codeword is found;
(ii) an invalid mode is detected while decoding;
(iii) the resynchronization word does not follow a decoded block of data;
(iv) a motion vector points outside of the frame;
(v) a decoded DCT value lies outside of permissible limits; or
(vi) the boundary contour is invalid (lies outside of the image).

If an error is detected in the boundary contour data, then the contour is dropped and is made a part of the background; this means the corresponding region of the previous frame is used. This reduces some distortion because there often is a lot of temporal correlation in the video sequence.

If an error is detected in the motion vector data, then the average motion vector for the object is applied to the entire object rather than each macroblock using its own motion vector. This relies on the fact that there is large spatial correlation in a given frame; therefore, most of the motion vectors of a given object are approximately the same. Thus the average motion vector applied to the various macroblocks of the object will be a good approximation and help reduce visual distortion significantly.

If an error is detected in the motion failure region DCT data, then all of the DCT coefficients are set to zero and the decoder attempts to resynchronize.

Error Correction

Figure 15A:
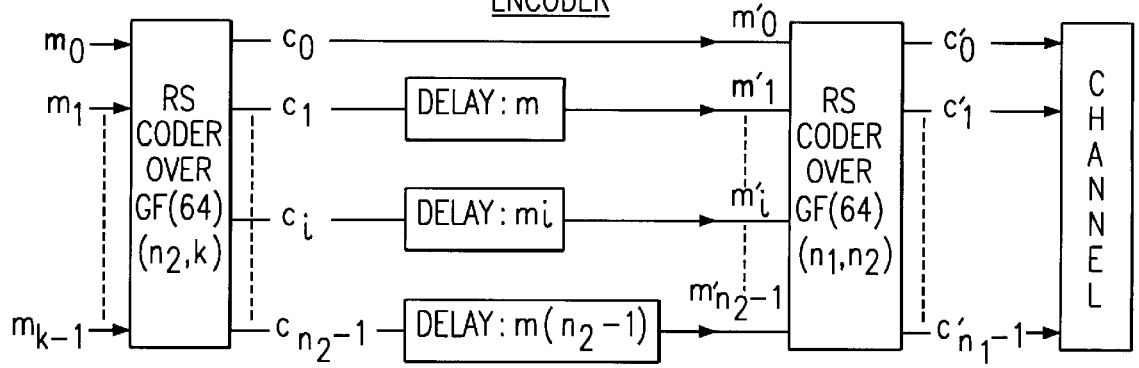
FIGS. 15a–b show an error correcting coder and decoder.

The error control code of the preferred embodiments comprises two Reed-Solomon (RS) coders with an interleaver in between as illustrated in FIG. 15a. The bitstream to be transmitted is partitioned into groups of 6 successive bits to form the symbols for the RS coders. This will apply generally to transmission over a channel with burst errors in addition to random errors. The interleaver mixes up the symbols from several codewords so that the symbols from any given codeword are well separated during transmission. When the codewords are reconstructed by the deinterleaver in the receiver, error bursts introduced by the channel are effectively broken up and spread across several codewords. The interleaver-deinterleaver pair thus transforms burst errors in to effectively random errors. The delay multiplier m is chosen so that the overall delay is less than 250 msec.

Each of the RS coders uses an RS code over the Galois field GF(64) and maps a block 6-bit information symbols into a larger block of 6-bit codeword symbols. The first RS coder codes an input block of k 6-bit information symbols as $n_2$ 6-bit symbols and feeds these to the interleaver, and the second RS coder takes the output of the interleaver and maps the $n_2$ 6-bit symbols into $n_1$ 6-bit codeword symbols; $n_1-n_2=4$.

At the receiver, each block of $n_1$ 6-bit symbols is fed to a decoder for the second coder. This RS decoder, though capable of correcting up to 2 6-bit symbol errors, is set to correct single errors only. When it detects any higher number of errors, it outputs $n_2$ erased symbols. The deinterleaver spreads these erasures over $n_2$ codewords which are then input to the decoder for the first RS coder. This decoder can correct any combination of E errors and S erasures such that $2E+S<=n_2-k$. If $2E+S$ is greater than the above number, then the data is output as is and the erasures in the data, if any, are noted by the decoder.

Figure 15B:
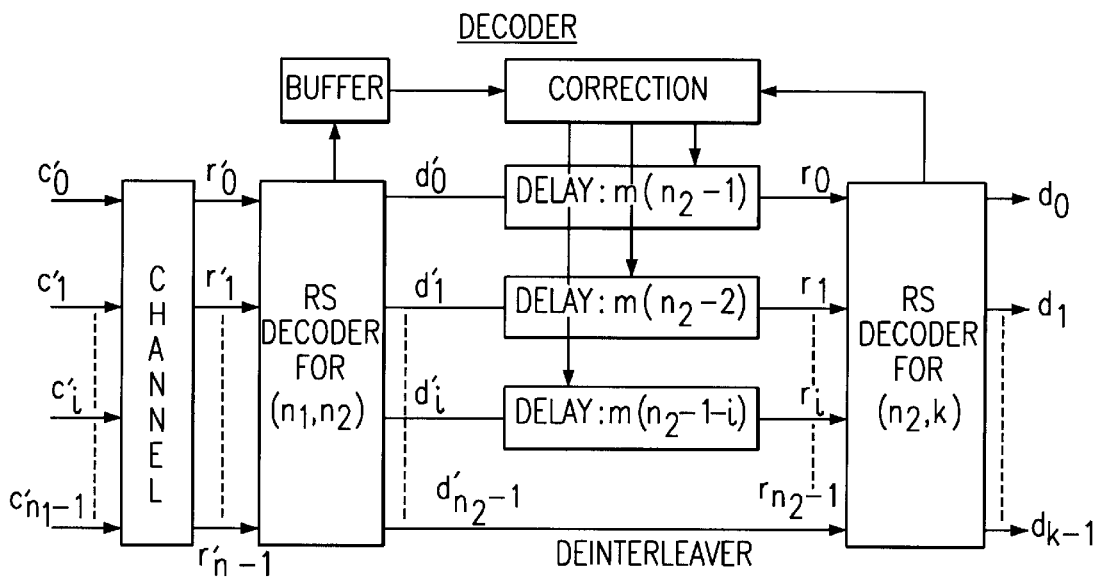

The performance of the preferred embodiment error-correcting exceeds the simple correction so far described by further adding a feedback from the second decoder (after the deinterleaver) to the first decoder and thereby improve the error correction of the first decoder. In particular, assume that the first decoder correct E errors and detects (and erases) T errors. Also presume the second decoder can correct S erasures in any given block of $N_2$ symbols. Further, assume that at time t the first decoder detects X errors in the input block B which consists of $N_1$ 6-bit symbols with X>E; this implies a decoding failure at time t. This decoding failure results in the first decoder outputting $N_2$ erased symbols. The preferred embodiment error correction system as illustrated in FIG. 15b includes a buffer to store the input block B of $N_1$ symbols and the time t at which the decoding failure occurred; this will be used in the feedback described below. The deinterleaver takes the $N_2$ erased symbol block output of the first decoder and spreads out the erased symbols over the next $N_2$ blocks: one erased symbol per block. Thus the erased symbols from block B appear at the second decoder at times t, t+d, t+2d, . . . t+($N_2$_1)d where d is the delay increment of the deinterleaver and relates to the block length.

Consider the time t. If the number of erased symbols in the input block to the second decoder at time t is less than or equal to S, then the second decoder can correct all the erasures in this input block. One of the corrected erasures derived from the input block B to the first decoder at time t. This corrected erasure can be either (1) one of the symbols of the input block B which was an error detected by the first decoder or (2) was not one of the symbols in error in block B but was erased due to the decoding failure.

Compare the corrected erasure with the contents of the corresponding location in block B which has been stored in the buffer. If the corrected erasure is the same as the corresponding contents of stored block B, then the corrected erased symbol was of category (2) and this output of the second decoder is used without any modification. However, if the corrected erased symbol does not match the contents of the corresponding location in block B, then this corresponding location symbol was one of the error symbols in block B. Thus this error has been corrected by the second decoder and this correction may be made in block B as stored in the buffer; that is, an originally uncorrectable error in block B for the first decoder has been corrected in the stored copy of block B by a feedback from the second decoder. This reduces the number of errors X that would be detected by the first decoder if the thus corrected block B were again input to the first decoder. Repeat this erasure correcting by the second decoder at later times t+id (i=1, . . . , ($N_2$_1)) which correspond to the erasures derived from B; this may reduce the number of errors detectable in block B to X-Y. Once X-Y is less than E, all of the remaining errors in the now corrected input block B can be corrected, and the deinterleaver may be updated with the thus corrected input block B. This reduces the number of erased symbols being passed to the second decoder at subsequent times, and thereby increasing the overall probability of error correction. Contrarily, if it is not possible to correct all of the errors in the input block B, then the corrections made by the second decoder are used without modification. Note that if an extension of the overall delay were tolerable, then the corrected block B could be reinput to the first decoder.

Simulations show that the foregoing channel coding is capable of correcting all burst lengths of duration less than 24 msec at transmission rates of 24 Kbps and 48 Kbps.

In the case of random errors of probability 0.001 for choices of $(k,n_2n_1)$ equal to (24,28,32), (26,30,34), (27,31, 34), and (28,32,36) the decoded bit error rate was less than 0.00000125, 0.000007, and 0.0000285, respectively with multiplier m=1. Similarly, for m=2 (38,43,48) may be used. Note that the overall delay depends upon the codeword size due to the interleaver delays. In fact, the overall delay is $$\text{delay}=(mn_2)^2 \, 6/\text{bitrate}$$

where the 6 comes from the use of 6-bit symbols and the second power from the number of symbols in the codewords determines the number of delays and the increment between delays. Of course, the number of parity symbols ($n_1$_$n_2$ and $n_2$ k) used depends upon the bit error rate performance desired and the overall delay.

In our simulations with a bitstream of 3604480, 6-bit symbols, at a probability of error of 1e−3, the number of erasures without feedback is 46/3604480, 6-bit symbols (1.28e−5). With feedback, the number of erasures is 24/3604480, 6-bit symbols (6.66e−6). For the combination of burst error and random errors, number of erasures without feedback is 135/3604480 (3.75e−5) and with feedback the number of erasures is 118/2703360, 6-bit symbols (3.27e−5).

Figure 16A:
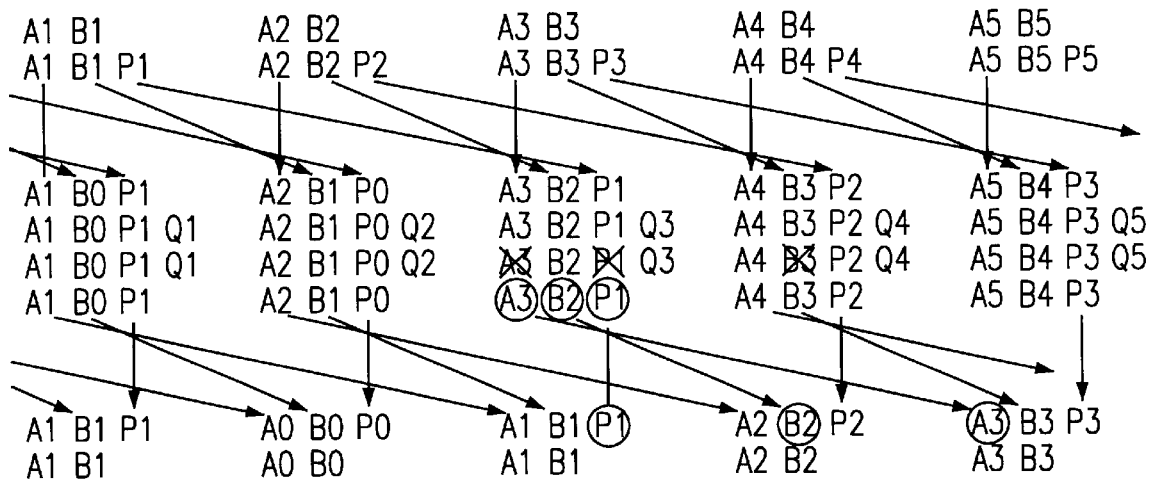
FIGS. 16a–b illustrate decoder feedback.
Figure 16B:
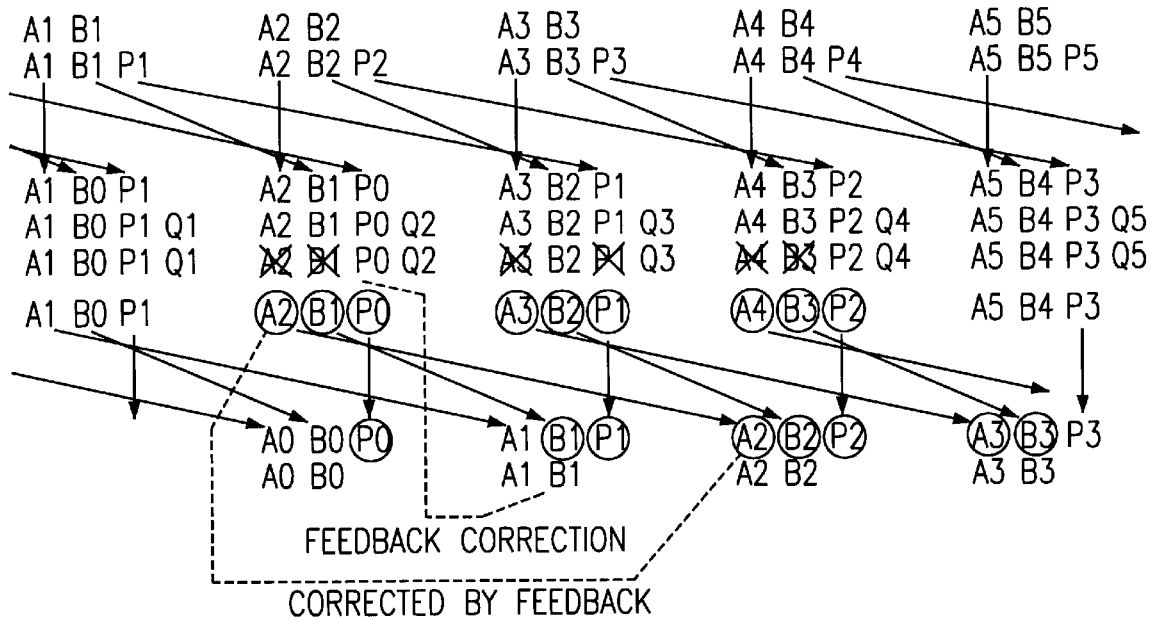

FIGS. 16a–b are heuristic examples illustrating the feedback error correction. In particular, the first row in FIG. 16a shows a sequence of symbols A1,B1,A2,B2 . . . which would be the information bitstream to be transmitted, each symbol would be a group of successive bits, (e.g. 6 bits). For simplicity of illustration, the first coder is presumed to encode two information symbols as a three symbol codeword; i.e., A1,B1, encodes as A1,B1,P1 with P1 being a parity symbol. This is analogous to the 26 information symbols encoded as 30 symbols with 4 parity symbols as in one of the foregoing preferred embodiments. The second row of FIG. 16a shows the codewords. The interleaver spreads out the symbols by delays as shown in the second and third rows of FIG. 16a. In detail the Aj symbols have no delays, the Bj symbols have delays of 3 symbols, and the Pj symbols have delays of 6 symbols. The slanting arrows in FIG. 16a indicate the delays.

The interleaver output (sequence of 3-symbol words) is encoded by the second encoding as 4-symbol codewords. The fourth row of FIG. 16a illustrates the second encoding of the 3-symbol words of the third row by adding a parity symbol Qi to form a 4-symbol codeword.

Row five of FIG. 16a indicates three exemplary transmission errors by way of the X's over the symbols A3,P1, and B3. Presume for simplicity that the decoders can correct one error per codeword or can detect two errors and erase the codeword symbols. The row 6 of FIG. 16a shows the decoding to correct the error in symbol B3 and erase the A3, B2, P1 word as indicated by O's over the symbols.

The deinterleaver reassembles the 3-symbol codewords by delays which are complementary to the interleaver delays: the Aj symbols have delays of 6 symbols, the Bj symbols have delays of 3-symbols and the Pj symbols have no delays. Rows 6–7 the delays with slanting arrows. Note the erased symbols spread out in the deinterleaving.

FIG. 16a row 8 illustrates the second decoder correcting the erased symbols to recover the A1,B1,A2,B2 . . . information.

FIG. 16b illustrates the same arrangement as FIG. 16a but with an additional error which can only be corrected by use of the preferred embodiment feedback to the deinterleaver. In particular, row 5 of FIG. 16b shows 6 errors depicted as X's over the symbols A2, B1, A3, P1, B3, and A4. In this case the first decoder detects two errors in each of the corresponding codewords and erases all three errors as illustrated by O's over the symbols in row 6 of FIG. 16*b*.

The deinterleaver again reassembles the 3-symbol codewords by delays which are complementary to the interleaver delays; rows 6–7 of FIG. 16*b* show the delays with slanting arrows. The erased symbols again spread out, but three erasures in codeword A2,B2,P2 cannot be corrected. However, the codeword A1, B1, P1 with B1 and P1 erased can be corrected by the second decoder to give the true codeword A1, B1, P1. Then the true B1 can be compared to the word A2,B1,P0,Q2 in row 5 and the fact that B1 differs in this word implies that B1 was one of the two errors in this word. Thus the true B1 can be used to form a word with only one remaining error (A2) and this word error corrected to give the true A2, B1, P0. This is the feedback: a later error correction (B1 in this example) is used to make an error correction in a previously uncorrected word (which has already been decoded) and then this correction of the past also provides a correction of a symbol (A2 in this example) for future use: the erased A2 being delayed in the interleaver can be corrected to true A2 and reduce the number of errors in the codeword A2, B2, P2 to two. Thus the codeword A2, B2, P2 can now be corrected. Thus the feedback from the A1, B1, P1 correction to the A2, B1, P0, Q2 decoding led to the correction of A2 and then to the possible correction of the codeword A2, B2, P2. Of course, the numbers of symbols used and correctable in these examples are heuristic and only for simple illustration.

Appendix

A listing of machine instructions written in the C language for an implementation of the foregoing preferred embodiments appears in the attached Appendix.

Modifications

The preferred embodiments may be varied in many ways while retaining one or more of their features. For example, the size of blocks, codes, thresholds, morphology neighborhoods, quantization levels, symbols, and so forth can be changed. Methods such as particular splines, quantization methods, transform methods, and so forth can be varied.

What is claimed is:

1. A method of motion compensation in an object-oriented video stream, comprising the steps of:
    (a) providing a frame with a single object;
    (b) replacing the background in said frame with a constant;
    (c) providing a second frame, said second frame following said frame;
    (d) for each block of pixels of said second frame and related to said object, comparing said block with second blocks of pixels in the result of step (b); and
    (e) defining a motion vector for said block by the comparisons of said step (d).

\* \* \* \* \*

UNITED STATES PATENT AND TRADEMARK OFFICE
CERTIFICATE OF CORRECTION

PATENT NO. : 6,272,253 B1
DATED : August 7, 2001
INVENTOR(S) : Thomas J. Bannon and Rajendra K. Talluri It is certified that error appears in the above-identified patent and that said Letters Patent is hereby corrected as shown below:

Title page,
Item [60], Related U.S. Application Data insert:
-- Provisional Application No. 60/005,970 filed 10/27/1995. --

Signed and Sealed this

Thirty-first Day of August, 2004

JON W. DUDAS
*Director of the United States Patent and Trademark Office*